(12) United States Patent
Erez et al.

(10) Patent No.: US 10,289,561 B2
(45) Date of Patent: May 14, 2019

(54) NONVOLATILE MEMORY DEVICES AND METHODS OF CONTROLLING THE SAME

(71) Applicant: SAMSUNG ELECTRONICS CO., LTD., Suwon-si, Gyeonggi-Do (KR)

(72) Inventors: Elona Erez, Tel Aviv (IL); Avner Dor, Kfar Saba (IL); Jun-Jin Kong, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 87 days.

(21) Appl. No.: 15/671,855

(22) Filed: Aug. 8, 2017

(65) Prior Publication Data
US 2019/0050343 A1    Feb. 14, 2019

(51) Int. Cl.
*G06F 12/10*      (2016.01)
*G06F 12/1009*   (2016.01)
*G06F 3/06*       (2006.01)

(52) U.S. Cl.
CPC ........ *G06F 12/1009* (2013.01); *G06F 3/0608* (2013.01); *G06F 3/0644* (2013.01); *G06F 3/0679* (2013.01); *G06F 2212/2022* (2013.01); *G06F 2212/7201* (2013.01)

(58) Field of Classification Search
CPC .. G06F 12/1009; G06F 3/0644; G06F 3/0608; G06F 3/0679; G06F 2212/7201; G06F 2212/2022
USPC ........................................................ 711/103
See application file for complete search history.

(56) References Cited

U.S. PATENT DOCUMENTS

| | | | |
|---|---|---|---|
| 7,395,404 B2 | 7/2008 | Gorobets et al. | |
| 7,594,062 B2 | 9/2009 | In et al. | |
| 7,802,054 B2 | 9/2010 | Park et al. | |
| 7,877,539 B2 | 1/2011 | Sinclair et al. | |
| 8,151,040 B2 | 4/2012 | Wong | |
| 8,417,893 B2 | 4/2013 | Khmelnitsky et al. | |
| 9,483,413 B2 | 11/2016 | Dor et al. | |
| 9,823,863 B1 * | 11/2017 | Lu ......................... | G06F 3/0619 |
| 2006/0218347 A1 | 9/2006 | Oshima | |
| 2013/0080730 A1* | 3/2013 | Kim ..................... | G06F 12/0246 |
| | | | 711/203 |
| 2014/0059279 A1 | 2/2014 | He et al. | |
| 2016/0274794 A1 | 9/2016 | Yoon | |
| 2018/0293174 A1* | 10/2018 | Song ..................... | G06F 3/0688 |

FOREIGN PATENT DOCUMENTS

| | | |
|---|---|---|
| KR | 10-1297442 | 8/2013 |
| KR | 10-1626218 | 6/2016 |

* cited by examiner

*Primary Examiner* — Hiep T Nguyen
(74) *Attorney, Agent, or Firm* — P. Chau & Associates, LLC

(57) ABSTRACT

A method of controlling a nonvolatile memory device includes: receiving a plurality of logical pages associated with a plurality of physical addresses, respectively; storing the plurality of logical pages at the plurality of physical addresses in a selected one of a plurality of sub-clusters according to a given order of logical addresses of the logical pages; generating a first table including an entry for each one of the ordered logical addresses identifying a cluster of the selected sub-cluster and an offset into the selected sub-cluster; and generating a second table including an entry for the selected sub-cluster and the cluster indicating one of the ordered logical addresses associated with a first physical page of the selected sub-cluster.

20 Claims, 16 Drawing Sheets

FIG. 8

First table (before update)

| Cluster # | Offset in sub-cluster |
|---|---|
| 0 | 2 | 0 |
| 1 | 2 | 1 |
| 2 | 2 | 2 |
| 3 | 1 | 0 |
| 4 | 2 | 3 |
| 5 | 1 | 1 |
| 6 | 1 | 2 |
| 7 | 1 | 3 |
| 8 | 1 | 0 |
| 9 | 2 | 0 |
| 10 | 2 | 1 |
| 11 | 2 | 2 |
| 12 | 1 | 1 |
| 13 | 2 | 3 |
| 14 | 1 | 2 |
| 15 | 1 | 3 |
| 16 | 1 | 0 |
| 17 | 1 | 1 |
| 18 | 2 | 0 |
| 19 | 2 | 1 |
| 20 | 2 | 2 |
| 21 | 2 | 3 |
| 22 | 1 | 2 |
| 23 | 2 | 0 |
| 24 | 1 | 3 |
| 25 | 2 | 1 |
| 26 | 2 | 2 |
| 27 |   |   |
| 28 | 2 | 3 |
| 29 |   |   |
| 30 |   |   |
| 31 |   |   |

First table (after update)

| Cluster # | Offset in sub-cluster |
|---|---|
| 0 | 2 | 0 |
| 1 | 2 | 1 |
| 2 | 2 | 2 |
| 3 | 1 | 0 |
| 4 | 2 | 3 |
| 5 | 1 | 1 |
| 6 | 1 | 2 |
| 7 | 1 | 3 |
| 8 | 1 | 0 |
| 9 | 2 | 0 |
| 10 | 2 | 1 |
| 11 | 2 | 2 |
| 12 | 1 | 1 |
| 13 | 2 | 3 |
| 14 | 1 | 2 |
| 15 | 1 | 3 |
| 16 | 1 | 0 |
| 17 | 1 | 1 |
| 18 | 2 | 0 |
| 19 | 2 | 1 |
| 20 | 2 | 2 |
| 21 | 2 | 3 |
| 22 | 1 | 2 |
| 23 | 2 | 0 |
| 24 | 1 | 3 |
| 25 | 2 | 1 |
| 26 | 2 | 2 |
| 27 | 1 | 0 |
| 28 | 2 | 3 |
| 29 | 1 | 1 |
| 30 | 1 | 2 |
| 31 | 1 | 3 |

FIG. 9

| | Second table (before update) Logical address |
|---|---|
| Cluster 1, sub-cluster 1 | 3 |
| Cluster 1, sub-cluster 2 | 8 |
| Cluster 1, sub-cluster 3 | 16 |
| Cluster 1, sub-cluster 4 | |
| Cluster 2, sub-cluster 1 | 0 |
| Cluster 2, sub-cluster 2 | 9 |
| Cluster 2, sub-cluster 3 | 18 |
| Cluster 2, sub-cluster 4 | 23 |

| | Second table (after update) Logical address |
|---|---|
| Cluster 1, sub-cluster 1 | 3 |
| Cluster 1, sub-cluster 2 | 8 |
| Cluster 1, sub-cluster 3 | 16 |
| Cluster 1, sub-cluster 4 | 27 |
| Cluster 2, sub-cluster 1 | 0 |
| Cluster 2, sub-cluster 2 | 9 |
| Cluster 2, sub-cluster 3 | 18 |
| Cluster 2, sub-cluster 4 | 23 |

FIG. 10

Second table
(before update)

Logical address

| | |
|---|---|
| Cluster 1, sub-cluster 2 | 8 |
| Cluster 1, sub-cluster 3 | 16 |
| Cluster 1, sub-cluster 4 | |
| Cluster 2, sub-cluster 1 | 9 |
| Cluster 2, sub-cluster 2 | 18 |
| Cluster 2, sub-cluster 3 | 23 |

Second table
(after update)

Logical address

| | |
|---|---|
| Cluster 1, sub-cluster 2 | 8 |
| Cluster 1, sub-cluster 3 | 16 |
| Cluster 1, sub-cluster 4 | 27 |
| Cluster 2, sub-cluster 1 | 9 |
| Cluster 2, sub-cluster 2 | 18 |
| Cluster 2, sub-cluster 3 | 23 |

FIG. 11

| | Cluster1 | |
|---|---|---|
| | Sub-cluster1 | Sub-cluster2 |

| | Sub-cluster1 | Sub-cluster2 | |
|---|---|---|---|
| subsub cluster 1 | 3 | 40 | subsub cluster 1 |
| | 5 | 41 | |
| | 6 | 42 | |
| | 7 | 44 | |
| subsub-cluster 2 | 8 | 49 | subsub cluster 2 |
| | 12 | 50 | |
| | 14 | 51 | |
| | 15 | 53 | |
| subsub cluster 3 | 16 | 58 | subsub cluster 3 |
| | 17 | 59 | |
| | 22 | 60 | |
| | 24 | 71 | |
| Subsub cluster 4 | 27 | 73 | subsub cluster 4 |
| | 29 | 75 | |
| | 30 | 76 | |
| | 31 | 78 | |

NONVOLATILE MEMORY DEVICES AND METHODS OF CONTROLLING THE SAME

BACKGROUND

1. Technical Field

Exemplary embodiments of the present inventive concept relate generally to nonvolatile memory devices, and more specifically generation and use of a flash translation layer (FTL) for the nonvolatile memory devices.

2. Discussion of Related Art

A volatile memory device loses its stored data when its power supply is interrupted. Examples of a volatile memory device include a static RAM (SRAM), a dynamic RAM (DRAM), a synchronous DRAM (SDRAM), etc. A nonvolatile memory device retains its stored data even when its power supply is interrupted. Examples of a nonvolatile memory device include a read only memory (ROM), a programmable ROM (PROM), an electrically programmable ROM (EPROM), an electrically erasable programmable ROM (EEPROM), a flash memory device, a phase-change RAM (PRAM), a magnetic RAM (MRAM), a resistive RAM (RRAM), a ferroelectric RAM (FRAM), etc.

Flash memory devices generally have a flash translation layer (FTL) which maps a logical address into a physical address of the flash memory device. However, the FTL can consume a large amount of space of the flash memory device.

SUMMARY

According to an exemplary embodiment of the inventive concept, a method of controlling a nonvolatile memory device including a plurality of clusters is provided. Each cluster includes a plurality of sub-clusters, and each sub-cluster includes a plurality of pages. The method includes: receiving a plurality of logical pages associated with a plurality of physical addresses, respectively; storing the plurality of logical pages at the plurality of physical addresses in a selected one of the sub-clusters according to a given order of logical addresses of the logical pages; generating a first table including an entry for each one of the ordered logical addresses identifying a cluster of the selected sub-cluster and an offset into the selected sub-cluster; and generating a second table including an entry for the selected sub-cluster and the cluster indicating one of the ordered logical addresses associated with a first physical page of the selected sub-cluster.

According to an exemplary embodiment of the inventive concept, a memory system is provided. The memory system includes a nonvolatile memory device and a memory controller. The nonvolatile memory device includes a plurality of clusters. Each cluster includes a plurality of sub-clusters, and each sub-cluster includes a plurality of pages. The memory control is configured to, receive a plurality of logical pages associated with a plurality of physical addresses, respectively; store the plurality of logical pages at the plurality of physical addresses in a selected one of the sub-clusters according to a given order of logical addresses of the logical pages; generate a first table including an entry for each one of the ordered logical addresses identifying a cluster of the selected sub-cluster and an offset into the selected sub-cluster; generate a second table including an entry for the selected sub-cluster and the cluster indicating one of the ordered logical addresses associated with a first physical page of the selected sub-cluster.

According to an exemplary embodiment of the inventive concept, a method of controlling a nonvolatile memory device including a plurality of clusters is provided. Each cluster includes a plurality of sub-clusters, each sub-cluster includes a plurality of subsub-clusters, and each subsub-cluster includes a plurality of pages. The method includes: receiving a plurality of logical pages associated with a plurality of physical addresses, respectively; storing the plurality of logical pages at the plurality of physical addresses in a selected one of the subsub-clusters in a selected one of the sub-clusters according to a given order of logical addresses of the logical pages; generating a first table including an entry for each one of the ordered logical addresses identifying a cluster of the selected sub-cluster and an offset into the selected subsub-cluster; generating a second table including an entry for the cluster and the selected sub-cluster indicating one of the ordered logical addresses associated with a first physical page of the selected sub-cluster; and generating a third table including an entry for the cluster, the selected sub-cluster, and the selected subsub-cluster indicating one of the ordered logical addresses associated with a first physical page of the selected subsub-cluster.

BRIEF DESCRIPTION OF THE DRAWINGS

The present inventive concept will become more apparent by describing in detail exemplary embodiments thereof with reference to the attached drawings, in which:

FIG. 8 illustrates an example of a first table created by the method;

FIG. 9 illustrates an example of a second table created by the method;

FIG. 10 illustrates another example of the second table created by the method;

FIG. 11 illustrates an example of a nonvolatile memory device after a method of controlling the nonvolatile memory device according to embodiment of the inventive concept has been applied;

DETAILED DESCRIPTION

Figure 1:
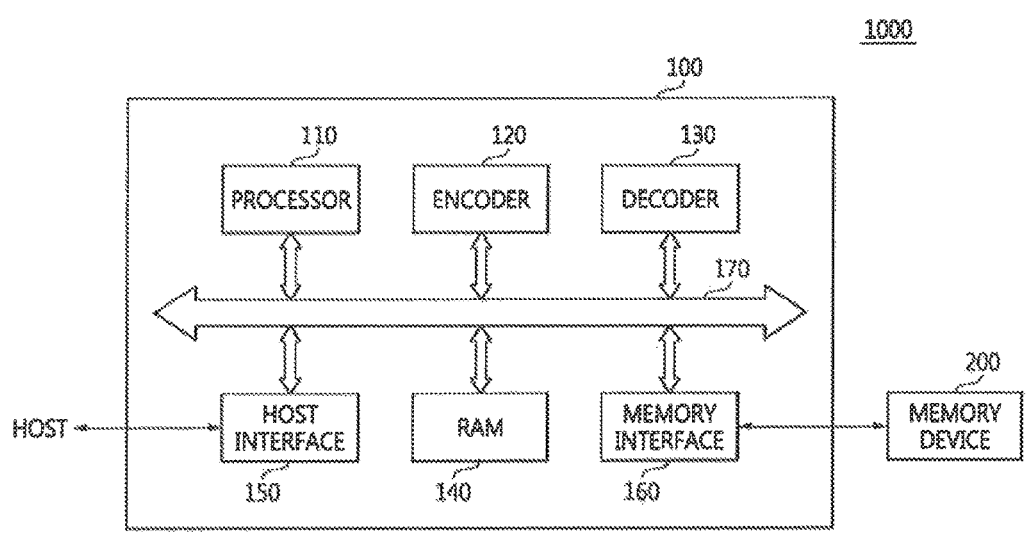
FIG. 1 is a block diagram of a memory system according to an exemplary embodiment of the inventive concept.

Example embodiments will now be described more fully with reference to the accompanying drawings. Many alternate forms may be embodied and example embodiments should not be construed as limited to example embodiments set forth herein. In the drawings, like reference numerals refer to like elements.

The terminology used herein is for the purpose of describing particular embodiments only and is not intended to be limiting of example embodiments. As used herein, the singular forms "a," "an" and "the" are intended to include the plural forms as well, unless the context clearly indicates otherwise.

Although the present inventive concept has been described in connection with exemplary embodiments thereof, those skilled in the art will appreciate that various modifications can be made to these embodiments without substantially departing from the principles of the present inventive concept.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

FIG. 1 is a block diagram of a memory system 1000 according to an exemplary embodiment of inventive concept.

As shown in FIG. 1, the memory system 1000 includes a memory controller 100 and a memory device 200. The controller 100 may be hardware, firmware, hardware executing software or any combination thereof. When the device controller 100 is hardware, such hardware may include one or more Central Processing Units (CPUs), digital signal processors (DSPs), application-specific-integrated-circuits (ASICs), field programmable gate arrays (FPGAs) computers or the like configured as special purpose machines to perform the functions of the device controller 100, such as a processor 110. CPUs, DSPs, ASICs and FPGAs may generally be referred to as processors and/or microprocessors.

In the event that the controller 100 is a processor executing software, the processor is configured as special purpose machine to execute the software to perform the functions of the controller 100. In such an embodiment, the controller 100 may include one or more Central Processing Units (CPUs), digital signal processors (DSPs), application-specific-integrated-circuits (ASICs), field programmable gate arrays (FPGAs) computers.

The memory device 200 may be a non-volatile memory device. For example, the memory device 200 may be a flash memory device, a phase change random access memory (PRAM), a ferroelectric RAM (FRAM), or a magnetic RAM (MRAM) device. The memory device 200 may be configured to include at least one non-volatile memory device and at least one volatile memory device, or at least two or more kinds of non-volatile memory devices.

In addition, the memory device 200 may be configured as a single flash memory chip, or multiple flash memory chips. The flash memory chips may be NAND flash memory chips.

The memory controller 100 includes a processor 110, an encoder 120, a decoder 130, a RAM 140, a host interface 150, a memory interface 160, and a bus 170.

The processor 110 is electrically connected to the encoder 120, the decoder 130, the RAM 140, the host interface 150, and the memory interface 160 via the bus 170.

The bus 170 denotes a transfer path through which information is transferred between elements of the memory controller 100.

The processor 110 controls overall operations of the memory system 1000. In particular, the processor 110 reads commands transmitted from a host and controls the memory system 1000 to perform an operation according to the read result.

The processor 110 provides the memory device 200 with a read command and an address during a reading operation, and provides the memory device 200 with a write command, an address, and an encoded codeword during a writing operation. In addition, the processor 110 converts a logical address received from the host into a physical page address by using metadata stored in the RAM 140.

The RAM 140 temporarily stores data transmitted from the host and data generated by the processor 110, or data read out from the memory device 200. Also, the RAM 140 may store metadata read out from the memory device 200. The RAM 140 may be a DRAM or an SRAM.

Metadata is information generated by the memory system 1000 in order to manage the memory device 200. The metadata, that is, managing information, includes mapping table information that is used to convert logical addresses into physical page addresses of the memory device 200. For example, the metadata may include page mapping table information that is necessary to perform an address mapping process per page unit. Also, the metadata may include information for managing storages of the memory device 200.

The host interface 150 includes a protocol for data exchange with a host connected to the memory device 200, and connects the memory device 200 and the host to each other. The host interface 150 may be realized as an advanced technology attachment (ATA) interface, a serial advanced technology attachment (SATA) interface, a parallel ATA (PATA) interface, a universal serial bus (USB) interface or a serial attached small (SAS) computer system interface, a small computer system interface (SCSI), embedded multimedia card (eMMC) interface, or a unix file system (UFS) interface. However, inventive concepts are not limited to the above examples. In particular, the host interface 150 may exchange commands, addresses, and data with the host according to control of the processor 110.

The memory interface 160 is electrically connected to the memory device 200. The memory interface 160 may support the interface with a NAND flash memory chip or a NOR flash memory chip. The memory interface 160 may be configured so that software and hardware interleaved operations may be selectively performed via a plurality of channels.

The processor 110 controls the memory system 1000 to read the metadata stored in the memory device 200 and store the metadata in the RAM 140, when an electric power is supplied to the memory system 1000A. The processor 110 controls the memory system 1000 to update the metadata stored in the RAM 140 according to an operation of generating metadata change in the memory device 200. In addition, the processor 110 controls the memory system 1000 to write the metadata stored in the RAM 140 in the memory device 200 before the memory system 1000 is turned off (POWER OFF).

The processor 110 controls the memory controller 100 to perform an encoding process of information words transmitted from the host in the encoder 120 during the writing operation, and to perform a decoding process of the data read from the memory device 200 in the decoder 130 during the reading operation.

Figure 2:
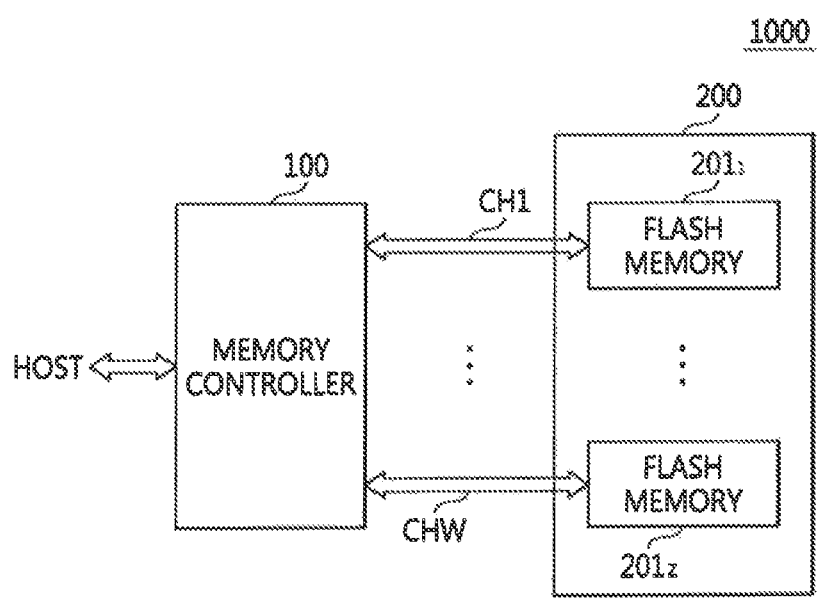
FIG. 2 is a block diagram of a memory system forming a plurality of channels by configuring a memory device shown in FIG. 1 with a plurality of memory chips.

FIG. 2 is a block diagram of a memory system 1000 forming a plurality of channels by configuring the memory device 200 shown in FIG. 1 with a plurality of memory chips.

The memory system 1000 includes first through N-th channels CH1-CHN (N is a natural number) and each of the channels may include flash memory chips. The number of flash memory chips included in each of the channels may vary.

The memory controller 100 of FIG. 2 is substantially the same as the memory controller 100 of FIG. 1, and detailed descriptions thereof are not provided here.

A plurality of flash memory chips $201_1$-$201_w$ may be electrically connected to each of the channels CH1 through CHW. Each of the channels CH1 through CHW may denote an independent bus that may transmit/receive commands, addresses, and data to/from the corresponding flash chips 201, 202, and 203. The flash memory chips connected to different channels may operate independently from each other. The plurality of flash memory chips 201, 202, and 203 connected to the channels CH1 through CHW may form a plurality of ways. Z number of flash memory chips may be connected to Z ways formed with respect to each of the channels CH1 through CHW.

For example, flash memory chips 201 may configure Z ways in the first channel CH1. Flash memory chips 201-1 through 201-Z may be connected respectively to the Z ways in the first channel CH1. Such relationships between the flash memory chips and the ways may be applied to the flash memory chips 202 and the flash memory chips 203.

The way is a unit for distinguishing the flash memory chips sharing the same channel. Each of the flash memory chips may be identified according to the channel number and the way number. It may be determined which flash memory chip performs the request provided from the host according to the logical address transmitted from the host.

Figure 3:
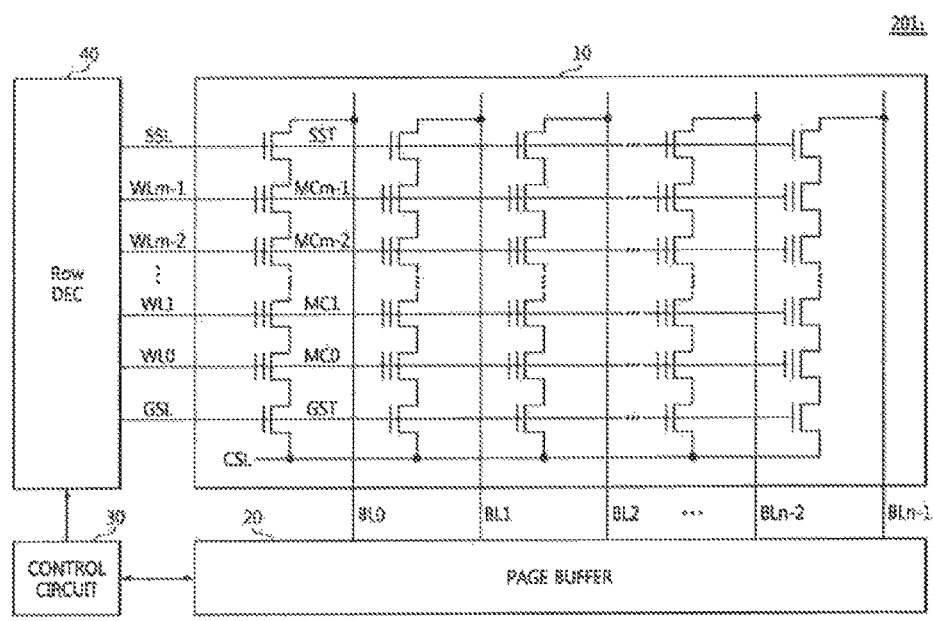
FIG. 3 is a diagram showing a circuit configuration of a flash memory chip according to an exemplary embodiment of the inventive concept.

FIG. 3 is a diagram showing a circuit configuration of one flash memory chip $201_1$ forming the memory device 200.

As shown in FIG. 3, the flash memory chip 201.sub.1 may include a cell array 10, a page buffer 20, a control circuit 30, and a row decoder 40.

Figure 4:
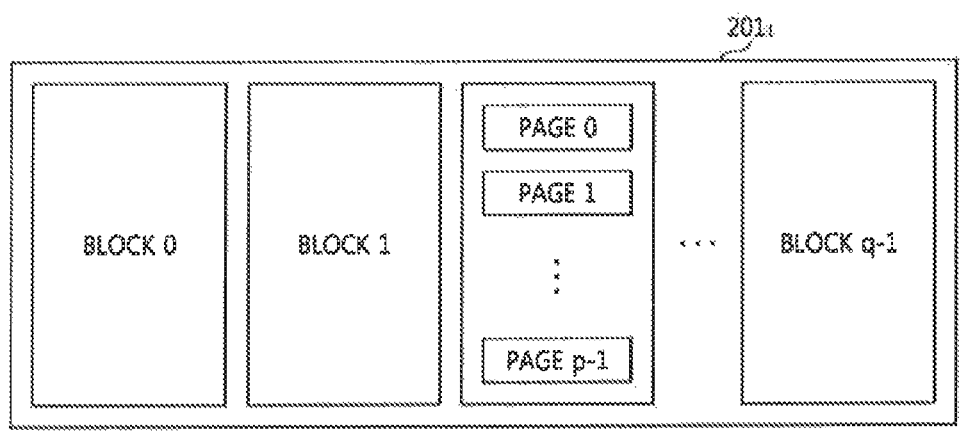
FIG. 4 illustrates a flash memory chip including a plurality of blocks according to an exemplary embodiment of the inventive concept.

The cell array 10 is an area in which data is written by applying a voltage to a transistor. The cell array 10 includes memory cells formed on points where word lines WL0 through WLm-1 and bit lines BL0 through BLn-1 cross each other. Here, m and n are natural numbers. In FIG. 4, only one memory block is shown; however, the cell array 10 may include a plurality of memory blocks. Each of the memory blocks includes a page corresponding to each of the word lines WL0 through WLm-1. In addition, each page may include a plurality of memory cells connected to the corresponding word line. The flash memory chip $201_1$ performs an erasing operation with respect to each memory block, and performs a programming operation or a reading operation with respect to each page.

The memory cell array 10 has a cell string structure. Each of cell strings includes a string selection transistor (SST) connected to a string selection line (SSL), a plurality of memory cells MC0 through MCm-1 respectively connected to the plurality of word lines WL0 through WLm-1, and a ground selection transistor (GST) connected to a ground selection line (GSL). Here, the SST is connected between the bit line and a string channel, and the GST is connected between the string channel and a common source line (CSL).

The page buffer 20 is connected to the cell array 10 via the plurality of bit lines BL0 through BLn-1. The page buffer 20 temporarily stores data that will be written in the memory cells connected to the selected word line, or the data read from the memory cells connected to the selected word line.

The control circuit 30 generates various voltages necessary to perform the programming operation or the reading operation, and the erasing operation, and controls overall operations of the flash memory chip $201_1$.

The row decoder 40 is connected to the cell array 10 via the SSL, the GSL, and the plurality of word lines WL0 through WLm-1. The row decoder 40 receives an address during the programming operation or the reading operation, and selects one of the word lines according to the input address. Here, the memory cells for performing the programming operation or the reading operation are connected to the selected word line.

Also, the row decoder 40 applies voltages that are necessary for the programming operation or the reading operation (for example, a programming voltage, a pass voltage, a reading voltage, a string selection voltage, and a ground selection voltage) to the selected word line, non-selected word lines, and the selection lines (SSL and GSL).

Each of the memory cells may store data of one bit or two or more bits. The memory cell storing the data of one bit may be referred to as a single level cell (SLC). In addition, the memory cell storing the data of two or more bits may be referred to as a multi-level cell (MLC). The SLC is in an erase state or a program state according to a threshold voltage thereof.

As shown in FIG. 4, the flash memory chip $201_1$ includes a plurality of blocks therein, and each of the blocks includes a plurality of pages.

In the flash memory chip $201_1$, the writing and reading of the data is performed per page unit, and an electric erasing is performed per block unit. In addition, the electric erasing operation of the block has to be performed before performing the writing operation. Accordingly, overwriting may not be possible.

In the memory device that is not capable of performing the overwriting, the user data may not be written in a physical area desired by the user. Therefore, when the host request to access in order to write or read data, an address conversion operation for converting the logical address representing an area that is requested to write or read data into a physical page address representing a physical area actually storing the data or will store the data is necessary.

Figure 5:
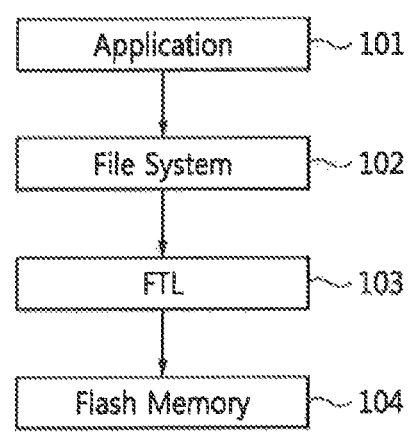
FIG. 5 illustrates diagram layers of the memory system shown in FIG. 1.

Referring to FIG. 5, the memory system 1000 has a hierarchical structure including an application layer 101, a file system layer 102, a flash translation layer (FTL) 103, and a flash memory layer 104.

The application layer 101 denotes firmware processing data in response to the user input from the host. In the application layer 101, the user data is processed in response to the user input, and a command for storing the processed user data in a flash memory chip is transmitted to the file system layer 102. The application 101 indicates various application programs being driven in an external device (e.g., a host, application processor, etc.). For example, the application 101 includes various computing programs such as a text editor, a web browser, an image player, a game program, etc.

In the file system layer 102, a logical address in which the user data will be stored is allocated in response to the command transmitted from the application layer 101. A file allocation table system or NTFS may be used as the file system in the file system layer 102. For example, the file system 102 may include a file allocation table (FAT), a FAT32, a NT File system (NTFS), a hierarchical file system (HFS), a journaled file system2 (JSF2), a XFS, an on-disk structure-5 (ODS-5), a UDF, a ZFS, a unix file system (UFS), ext2, ext3, ext4, ReiserFS, Reiser4, ISO, 9660, Gnome, VFS, EFS or WinFS.

The FTL 103 can provide an interface between the host and the nonvolatile memory device 120. In the FTL 103, the logical address transmitted from the file system layer 102 is converted to the physical page address for performing the writing/reading operations in the flash memory chip. In the FTL 103, the logical address may be converted into the physical page address by using mapping information included in the metadata. The address conversion operation in the FTL 103 may be performed by the processor 110 of the memory controller 100.

In the flash memory layer 104, control signals for storing or reading data by accessing the physical page address converted from the logical address are generated.

In an exemplary embodiment, the FTL 103 is stored in the RAM 140. Example embodiments described below are described using page level FTL where the mapping granularity is a page (a sector). The term "page" may refer to a reading/writing unit that can be 4 KB or 8 KB, for example. It should be understood that page is not limited to being a data size of 4 KB or 8 KB.

In page level FTL, a logical page is mapped into a physical page. Each logical page is represented by an entry in the FTL 103. If the total number of pages in the memory device is n, then the size of the FTL is $\log_2(n)$ bits. Therefore, the total size of an FTL table is $n \times \log_2(n)$. Consequently, for a device of size 64 gigabytes (GB), the size of the FTL table is 20 megabytes (MB). Exemplary embodiments of the inventive concept reduce the size of the FTL table. Consequently, the size of the RAM 140 may be reduced.

Figure 6:
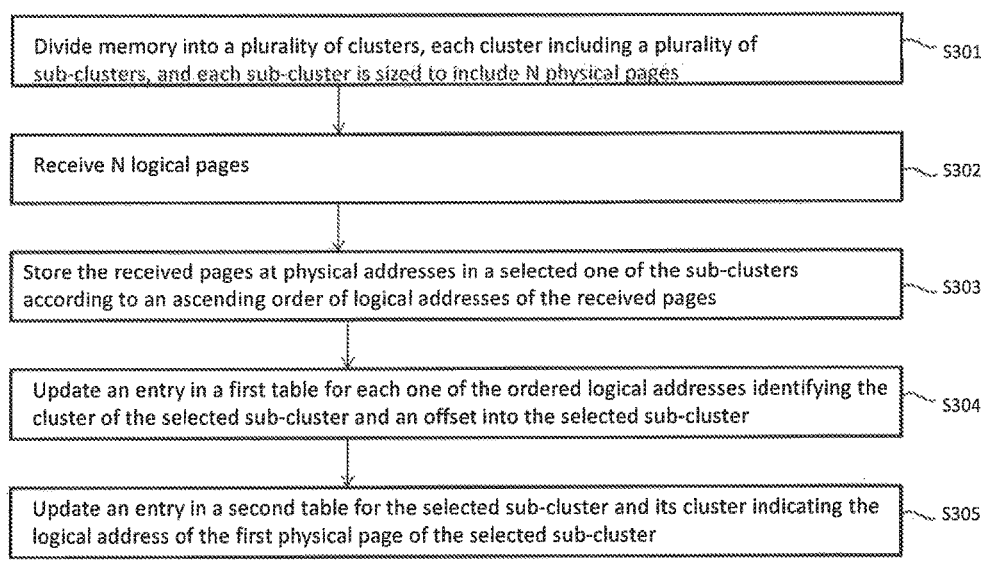
FIG. 6 illustrates a method of controlling a nonvolatile memory device according to an exemplary embodiment of the inventive concept.

FIG. 6 illustrates a method of controlling a nonvolatile memory device according to an exemplary embodiment of the inventive concept.

Figure 7:
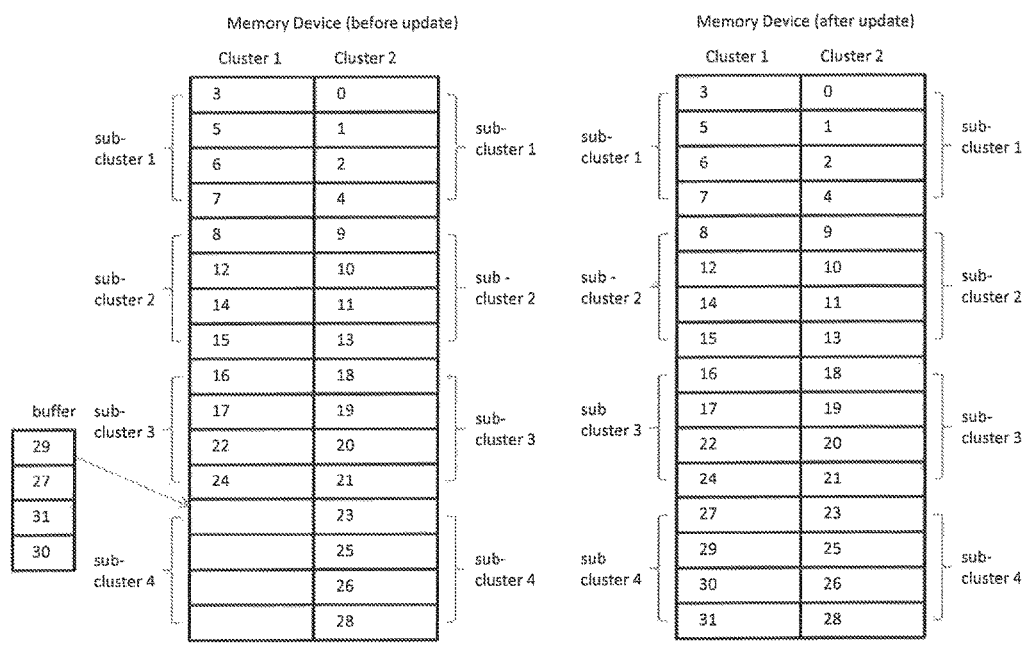
FIG. 7 illustrates an example of the nonvolatile memory device before and after the method has been applied.

At S301, the controller 100 divides a memory device 200 into a plurality clusters, each cluster including a plurality of sub-clusters, and each cluster is sized to include N physical pages (where N is typically more than 1). For example, as shown in FIG. 7, the memory device has been divided into a first cluster (e.g., Cluster 1) and a second cluster (e.g., Cluster 2), each cluster includes 4 sub-clusters (sub-cluster 1, 2, 3, and 4), and each sub-cluster includes 4 physical pages (e.g., N=4). The inventive concept is not limited use of only 2 clusters, clusters containing 4 sub-clusters, and sub-clusters containing 4 physical pages, as there may be more than 2 clusters, less than 4 or more than 4 sub-clusters per sub-clusters, and less than 4 or more than 4 physical pages per sub-cluster in alternate embodiments.

At S302, the controller 100 receives N logical pages to write to the memory device 200 from a host. In this example, the N is the same number as the number of physical pages in each sub-cluster for ease of explanation. However, the inventive concept is not limited thereto as the controller 100 may receive any number of logical pages in alternate embodiments. The N logical pages have logical addresses, respectively. For example, if N=4, then the controller 100 receives a first page (or sector) of data and its corresponding first logical address, a second page of data and its corresponding second logical address, a third page of data and its corresponding third logical address, and a fourth page of data and its corresponding fourth logical address.

FIG. 7 shows a NAND flash memory with 32 pages and a buffer of size 4 pages. The numbers indicate the logical addresses of the pages. The buffer (e.g., synchronous random access memory (SRAM) and/or dynamic random access memory (DRAM) temporarily stores data to be stored in the nonvolatile memory and/or data read from the nonvolatile memory. The buffer memory may be implemented by a volatile and/or a nonvolatile memory. The buffer memory may be implemented in the RAM 140, but is not limited thereto. In general, the buffer memory may be implemented in any type of memory, for example, a NAND flash. The buffer may store more than 4 pages. In an embodiment, the buffer is sized to store as many pages as a cluster holds.

Before the update, the memory device 200 stores 4 pages having logical addresses 3, 5, 6, and 7 to the first sub-cluster of the first cluster, 4 pages having logical addresses 8, 12, 14, and 15 to the second sub-cluster of the first cluster, 4 pages having logical addresses 16, 17, 22, and 24 to the third sub-cluster of the first cluster, 4 pages having logical addresses 0, 1, 2, and 4 to the first sub-cluster of the second cluster, 4 pages having logical addresses 9, 10, 11, and 13 to the second sub-cluster of the second cluster, 4 pages having logical addresses 18, 19, 20, and 21 to the third sub-cluster of the second cluster, and 4 pages having logical addresses 23, 25, 26, and 28 to the fourth sub-cluster of the second cluster.

The buffer stores pages having logical address 29, 27, 31, 30. At S303, the received logical pages are stored at physical addresses in a selected one of the sub-clusters according to an ascending order of logical address of the received logical pages. For example, the pages stored in the buffer memory are sorted in ascending order according to their logical addresses and stored sequentially in respective physical pages in an empty/unused sub-cluster (e.g., sub-cluster 4 of cluster 1) of the memory device 200. As shown, the controller 100 stores the logical page corresponding to the logical address 27 first, then the logical page corresponding to the logical address 29, then the logical page corresponding to the logical address 30, and lastly the logical page corresponding to the logical address 31.

In S304, the controller 100 updates an entry in a first table for each one of the ordered logical addresses identifying the cluster of the selected sub-cluster and an offset into the selected sub-cluster. FIG. 8 is an example of the first table. Before the first table is updated, the entries of the first table for logical addresses 0-26 and 28 include a cluster number and an offset into a sub-cluster. After the first table is updated, the entry of the first table for logical address 27 identifies cluster 1 and sub-cluster offset 0, the entry of the first table for logical address 29 identifies cluster 1 and sub-cluster offset 1, the entry of the first table for logical address 30 identifies cluster 1 and sub-cluster offset 2, and the entry of the first table for logical address 31 identifies cluster 1 and sub-cluster offset. For example, the entry of the first table for logical address 27 identifies sub-cluster offset 0 since a physical page associated with logical address 27 is stored in the first page within its sub-cluster in FIG. 7, and the entry of the first table for logical address 29 identifies sub-cluster offset 1 since the physical page associated with logical address 29 is stored in the second page within its sub-cluster in FIG. 7.

In S305, the controller 100 updates an entry in a second table for the selected sub-cluster and its cluster indicating the logical address of the first physical page of the selected sub-cluster. FIG. 9 is an example of the second table. Before the second table is updated, the first entry of the second table for the first cluster and the first sub-cluster identifies logical address 3 because the first physical page in the first sub-cluster in the first cluster of FIG. 7 has a logical address of 3, the second entry of the second table for the first cluster and the second sub-cluster identifies logical address 8 because the first physical page in the second sub-cluster in the first cluster of FIG. 7 has a logical address of 8, and the third entry of the second table for the first cluster and the third sub-cluster identifies logical address 16 because the first physical page in the third sub-cluster in the first cluster of FIG. 7 has a logical address of 16. After the second table is updated, the fourth entry of the second table for the first cluster and the fourth sub-cluster identifies logical address 27 because the first physical page in the fourth sub-cluster in the first cluster of FIG. 7 has a logical address of 27.

The first table illustrated in FIG. 8 can be realized with 32*3=96 bits and the second table illustrated in FIG. 9 can be realized with 40 bits, resulting in a FTL table of 136 bits total, whereas a conventional FTL table would require 160 bits (i.e., a 15% size reduction).

The first and second tables may be used by the controller 100 subsequently as a FTL table to access a physical page associated with a logical address received by a host when the host desires to read or write a page associated with the logical address. For example, if the host desires to read a physical page associated with a particular logical address, the host sends a read command to the controller 100 including the particular logical address (e.g., a read address). The controller 100, in response to receiving the read address, accesses the first and second tables in order to retrieve the corresponding physical page. First, the controller 100 accesses the entry of the first table associated with the read address to retrieve a cluster number (e.g., an index) and an offset into a sub-cluster. For example, if the read address is 19, the controller 100 would retrieve a cluster number of 2 and an offset of 1. Next, the controller 100 selects a section of the second table associated with the retrieved cluster number, and sequentially compares the read address against logical addresses of the entries of the section until there is an exact match or the logical address of one of the entries of the section is greater than the read address. If there is a match, then the sub-cluster number associated with the matching entry is retrieved. If the logical address of one of the entries is greater than the read logical address, then the sub-cluster number associated with the previous entry is retrieved. The sub-cluster number retrieved from the second table is then used along with the cluster number and sub-cluster offset previously retrieved from the first table to retrieve the physical page associated with the logical address. For example, if the read address is 19, the controller 100 would select the section of the second table associated with cluster 2 (i.e., entries 5-8), advance to entry 5, compare the 0 logical address of entry 5 against 19 to determine that 0 is less than 19, then advance to entry 6 since 0 is less than 19, compare the 9 logical address of entry 6 against 19 to determine that 6 is less than 19, advance to entry 7 since 6 is less than 19, compare the 18 logical address of entry 7 against 19 to determine 18 is less than 19, advance to entry 8 since 18 is less than 19, compare the 23 logical address of entry 7 against 19 to determine that the current entry is greater that the logical read address, and accordingly, the controller 100 would retrieve the sub-cluster number 3 of the prior entry. Thus, the location of the physical page associated with a read logical address of 19 is cluster 2, sub-cluster 3, and offset 1, as shown in FIG. 7.

An FTL scheme that accesses a physical page using the first and second table requires two accesses, a first to access the first table using the read logical address, and a second to access the second table using the cluster identified by the accessing the first table.

The above-described comparison to determine whether a read address is exactly the same as the logical address of an entry of the second table may be omitted.

FIG. 10 illustrates a second table similar to that of FIG. 9, but reduced in size by removing the entry associated with the first sub-cluster of the first cluster, and the entry associated with the first sub-cluster of the second cluster. This is because the sub-cluster offset can be inferred when the read address corresponds to a physical address that is in a first page of a given sub-cluster. For example, if the read address is 3, the controller 100 would retrieve a cluster number of 1 and an offset of 1 from the first table. Then, the controller 100 would select the section of the second table of FIG. 10 associated with the first cluster, and compare the read address of 3 with the logical addresses of 8, 16, and 27 of the section to determine that the read address is less than all of the logical addresses, and accordingly conclude that the sub-cluster offset is 0. The size of the reduced second table is 6×log (32)=30. Together with the 96 bits of the first table, the reduced second table results in an FTL table of 126 bits total, whereas a conventional FTL table would require 160 bits (i.e., a 21% size reduction).

Figure 12:
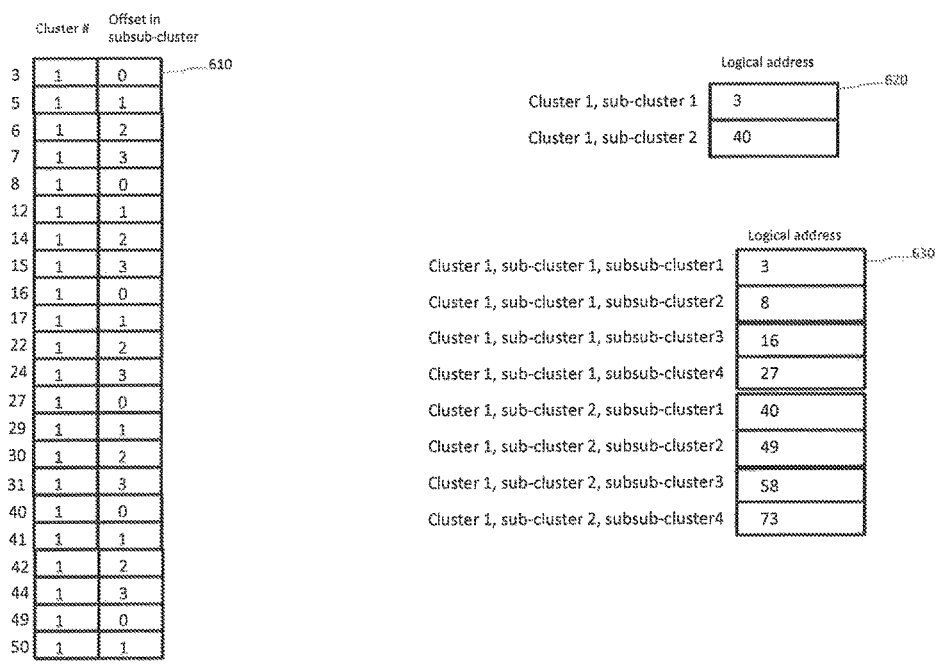
FIG. 12 illustrates first, second, and third tables generated by the method described with respect to FIG. 11.

FIG. 11 and FIG. 12 are used to illustrate another embodiment of the inventive concept. In FIG. 11, the memory device is divided into clusters, each cluster is divided into sub-clusters, and each sub-cluster is divided into sub-sub clusters. In FIG. 11, while only a single cluster is illustrated, there may be additional clusters; while the single cluster is illustrated as including two sub-clusters, the cluster may include more than two sub-clusters; while each sub-cluster is illustrated as including four subsub-clusters, each sub-cluster may include less than or more than four subsub-clusters. It is assumed that logical addresses associated with a given sub-cluster have been sorted in ascending order and then physical pages associated with the sorted logical addresses have been sequentially stored in the sub-cluster. For example, as shown in FIG. 11, the first sub-cluster includes logical addresses increasing in value from 3 to 31, and the second sub-cluster includes logical address increasing in value from 40 to 78.

FIG. 12 illustrates a first table 610, a second table 620, and a third table 630 created and maintained by controller 100.

The first table includes an entry for each of the logical addresses associated with the physical pages of the memory device illustrated in FIG. 11. Each entry of the first table 610 includes a cluster number and an offset into a subsub cluster. For example, since the physical page in FIG. 11 associated with logical address 3 is located in the first cluster and has a 0 offset within its subsub-cluster, the entry in the first table 610 associated with logical address 3 includes cluster number 1 and subsub-cluster offset 0.

The second table 620 includes the logical address of the first page of each sub-cluster. For example, the second table 620 includes a first entry for the first sub-cluster of a logical address of 3 since the first page of the first sub-cluster has a logical address of 3, and includes a second entry for the second sub-cluster of a logical address of 40 since the first page of the second sub-cluster has a logical address of 40.

The third table 630 includes a section for the first cluster and the first sub-cluster of the first cluster and another section for the first cluster and the second sub-cluster of the first cluster. Each entry of each section includes the logical address of the first page of each subsub-cluster of the corresponding sub-cluster. For example, the section corresponding to the first cluster and the first sub-cluster includes the logical address of 3 corresponding to the first physical page of the first subsub-cluster of the first sub-cluster, the logical address of 8 corresponding to the first physical page of the second subsub-cluster, the logical address of 16 corresponding to the first physical page of the third subsub-cluster, and the logical address of 27 corresponding to the first physical page of the fourth subsub-cluster.

If a host requests to a read logical address 5, the controller 100 reads the entry of the first table 610 of FIG. 12 associated with address 5 to retrieve a cluster number of 1 and an offset into a subsub-cluster of 1. Then, the controller 100 selects the section of the second table 620 of FIG. 12 associated with the first cluster and compares each logical address of the selected section with the read address. Since the logical address of 40 is the first entry in the second table 620 that is greater than the read address of 5, the controller 100 returns a sub-cluster number of the prior entry, i.e. 1. Next, the controller 100 selects the section of the third table 630 associated with cluster 1 and sub-cluster 1 since a cluster number of 1 and a sub-cluster number of 1 were previously returned. Next, the controller 100 compares the read address of 5 against the entries of the selected section of the third table to determine that the first entry in the third table 630 that is greater than 5 has a logical address of 8, and accordingly returns the subsub-cluster number of 1 of the previous entry. So, now the controller 100 knows the physical page corresponding to logical address of 5 is located in cluster 1, sub-cluster 1, subsub-cluster 1, with a 1 offset into subsub-cluster 1, as shown in FIG. 11.

Figure 13:
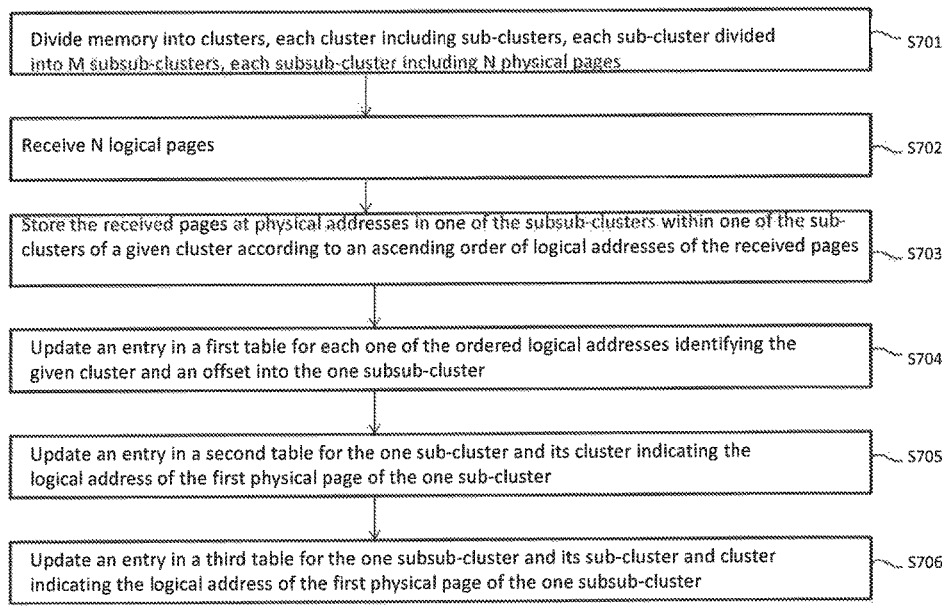
FIG. 13 illustrates a method of controlling a nonvolatile memory device according to an exemplary embodiment of the inventive concept.
Figure 14:
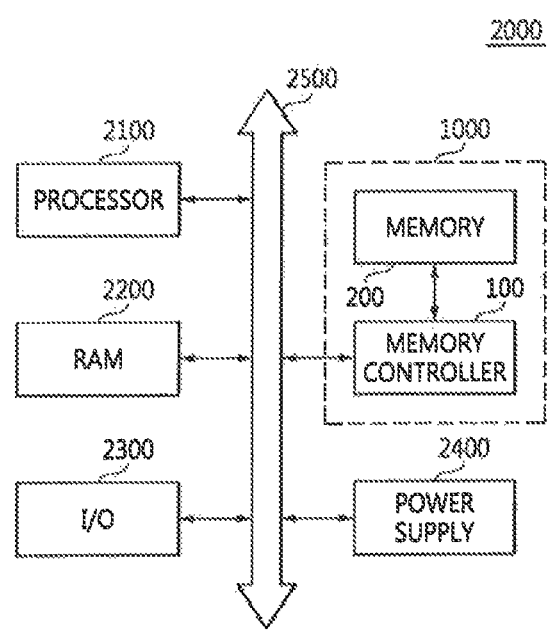
FIG. 14 is a block diagram of an electronic system adopting a memory system according to an exemplary embodiment of the inventive concept.
Figure 15:
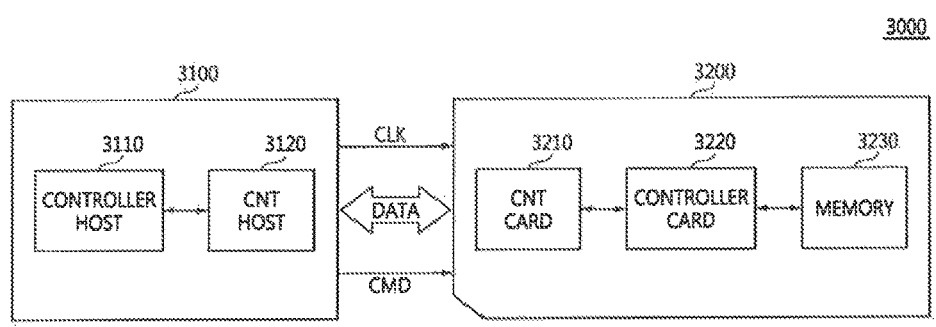
FIG. 15 is a block diagram of a memory card system including a memory system according an exemplary embodiment of the inventive concept.
Figure 16:
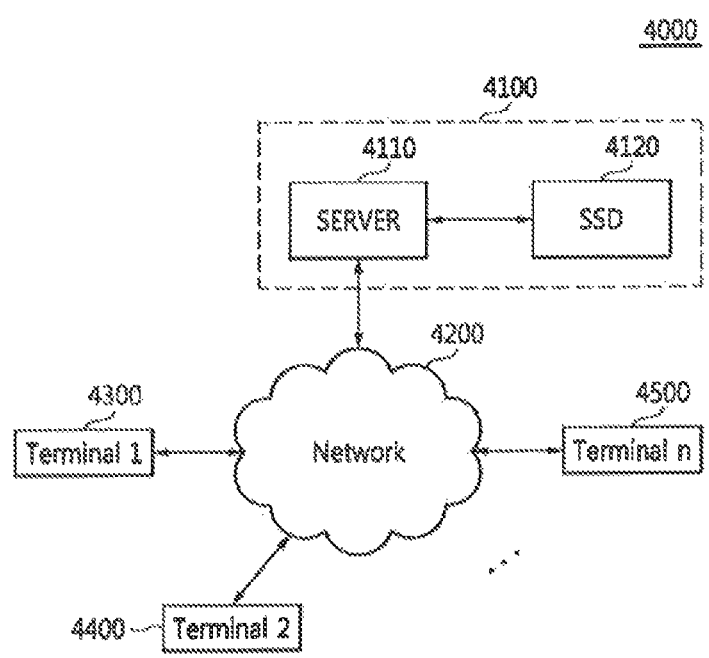
FIG. 16 is a block diagram of an example of configuring a network of a server system including an SSD according an exemplary embodiment of the inventive concept.

FIG. 13 illustrates a method of controlling a nonvolatile memory device according to an exemplary embodiment of the inventive concept.

At S701, the controller 100 divides the memory into a plurality of clusters, where each cluster includes a plurality of sub-clusters, and each sub-cluster is divided into M subsub-clusters (e.g., M is greater than 1), and each sub-cluster is sized to include N physical pages (e.g., N is greater than 1).

At S702, the controller receives N logical pages.

At S703, the received pages are stored at physical addresses in one of the subsub-clusters within one of the sub-clusters of a given cluster according to an ascending order of logical addresses of the received order. For example, if logical addresses of 3, 5, 6, and 7 are received, their corresponding pages could be stored in the first cluster, the first sub-cluster within the first cluster, and the first subsub-cluster within the first sub-cluster, as shown in FIG. 11.

At S704, an entry in a first table for each one of the ordered logical addresses identifying the given cluster and an offset into the one subsub-cluster is updated. For example, since the page associated with the logical address of 3 was stored in the first page of the first subsub-cluster within the first sub-cluster of the first page, the first entry of the first table 610 includes a cluster number of one and an offset of 0.

At S705, an entry in the second table for the one sub-cluster and its cluster indicating the logical address of the first physical page of the one sub-cluster is updated. For example, since the one sub-cluster is the first sub-cluster, and the logical address of the first physical page of the first sub-cluster is 3, the entry of the second table 620 associated with cluster 1 and sub-cluster 1 is set to 3.

At S706, an entry in a third table for the one subsub-cluster and its sub-cluster and cluster indicating the logical address of the first physical page of the one sub-cluster is updated. For example, since the pages associated with logical addresses 3, 5, 6, and 7 are stored in subsub-cluster 1, within the first sub-cluster of the first cluster, the first entry of the third table 630 associated with first cluster, first sub-cluster, and first subsub-cluster is set to the logical address of 3 associated with the first physical page of the first subsub-cluster.

An FTL scheme that accesses a physical page using the first table 610, the second table 620, and the third table 630 requires three accesses, a first to access the first table 610 using the read address to retrieve a cluster number and a subsub-cluster offset, a second to access the second table 620 using the cluster number to retrieve the sub-cluster number, and a third to access the third table 630 using the cluster number and sub-cluster number to retrieve the subsub-cluster number.

At least one embodiment of the inventive concept enable requires less reads per FTL usage compared an FTL scheme that partitions the memory device into only clusters.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

The memory system according to inventive concepts may be mounted by using various types of packages. For example, the memory system according to inventive concepts may be mounted by using packages such as a package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metricquad flat pack (MQFP), thin quad flatpack (TQFP), small outline (SOIC), shrink small outline package (SSOP), thin small outline (TSOP), thin quad flatpack (TQFP), system in package (SIP), multi-chip package (MCP), wafer-level fabricated package (WFP), and wafer-level processed stack package (WSP).

Although the present inventive concept has been described in connection with exemplary embodiments thereof, those skilled in the art will appreciate that various modifications can be made to these embodiments without substantially departing from the principles of the present inventive concept.

What is claimed is:

1. A method of controlling a nonvolatile memory device including a plurality of clusters, each cluster including a plurality of sub-clusters, and each sub-cluster including a plurality of pages, the method comprising:
   receiving a plurality of logical pages associated with a plurality of physical addresses, respectively;
   storing the plurality of logical pages at the plurality of physical addresses in a selected one of the sub-clusters according to a given order of logical addresses of the logical pages;
   generating a first table including an entry for each one of the ordered logical addresses identifying a cluster of the selected sub-cluster and an offset into the selected sub-cluster; and
   generating a second table including an entry for the selected sub-cluster and the cluster indicating one of the ordered logical addresses associated with a first physical page of the selected sub-cluster.

2. The method of claim 1, wherein the given order is an ascending order.

3. The method of claim 1, wherein the offset for the entry associated with one of the ordered logical addresses is a location of a physical page associated with the one ordered logical address within the selected sub-cluster.

4. The method of claim 1, wherein the logical pages are received by a memory controller from a host.

5. The method of claim 1, further comprising generating a flash translation layer (FTL) table including the first table and the second table.

6. The method of claim 1, further comprising:
   receiving a read address;
   accessing the first table using the read address to retrieve a cluster index identifying one of the clusters and a sub-cluster offset;
   accessing the second table using the retrieved cluster index to retrieve a sub-cluster index identifying one of the sub-clusters; and
   retrieving a physical page of the memory device using the cluster index, the sub-cluster index, and the sub-cluster offset.

7. The method of claim 6, wherein the accessing the second table comprises:
   sequentially comparing the read address against logical addresses of entries of the second table to determine until finding a select one of the entries of the second table having a logical address greater than the read address;
   determining an index of one of the entries of the second table that is previous to the selected entry; and
   setting the sub-cluster index to the index.

8. The method of claim 6, wherein the accessing the second table comprises:
   sequentially comparing the read address against logical addresses of entries of the second table to determine until finding a select one of the entries of the second table having a same logical address as the read address; and
   setting the sub-cluster index to an index of the selected one entry.

9. A memory system comprising:
   a nonvolatile memory device including a plurality of clusters, each cluster including a plurality of sub-clusters, and each sub-cluster including a plurality of pages; and
   a memory controller configured to,
      receive a plurality of logical pages associated with a plurality of physical addresses, respectively;
      store the plurality of logical pages at the plurality of physical addresses in a selected one of the sub-clusters according to a given order of logical addresses of the logical pages;
      generate a first table including an entry for each one of the ordered logical addresses identifying a cluster of the selected sub-cluster and an offset into the selected sub-cluster; and
      generate a second table including an entry for the selected sub-cluster and the cluster indicating one of the ordered logical addresses associated with a first physical page of the selected sub-cluster.

10. The memory system of claim 9, wherein the given order is an ascending order.

11. The memory system of claim 9, wherein the offset for the entry associated with one of the ordered logical addresses is a location of a physical page associated with the one ordered logical address within the selected sub-cluster.

12. The memory system of claim 9, wherein memory controller is configured to receive the logical pages from a host external to the memory controller.

13. The memory system of claim 9, wherein the memory controller maintains a flash translation layer (FTL) table including the first table and the second table.

14. The memory system of claim 9, wherein the memory controller is configured to,
   receive a read address;
   access the first table using the read address to retrieve a cluster index identifying one of the clusters and a sub-cluster offset;
   access the second table using the retrieved cluster index to retrieve a sub-cluster index identifying one of the sub-clusters; and
   retrieve a physical page of the memory device using the cluster index, the sub-cluster index, and the sub-cluster offset.

15. The memory system of claim 14, wherein the memory controller is configured to,
   sequentially compare the read address against logical addresses of entries of the second table to determine until finding a select one of the entries of the second table having a logical address greater than the read address;

determine an index of one of the entries of the second table that is previous to the selected entry; and set the sub-cluster index to the index.

16. The memory system of claim 14, wherein the memory controller is configured to, sequentially compare the read address against logical addresses of entries of the second table to determine until finding a select one of the entries of the second table having a same logical address as the read address; and set the sub-cluster index to an index of the selected one entry.

17. A method of controlling a nonvolatile memory device including a plurality of clusters, each cluster including a plurality of sub-clusters, each sub-cluster including a plurality of subsub-clusters, and each subsub-cluster including a plurality of pages, the method comprising:

receiving a plurality of logical pages associated with a plurality of physical addresses, respectively;

storing the plurality of logical pages at the plurality of physical addresses in a selected one of the subsub-clusters in a selected one of the sub-clusters according to a given order of logical addresses of the logical pages;

generating a first table including an entry for each one of the ordered logical addresses identifying a cluster of the selected sub-cluster and an offset into the selected subsub-cluster;

generating a second table including an entry for the cluster and the selected sub-cluster indicating one of the ordered logical addresses associated with a first physical page of the selected sub-cluster; and generating a third table including an entry for the cluster, the selected sub-cluster, and the selected subsub-cluster indicating one of the ordered logical addresses associated with a first physical page of the selected subsub-cluster.

18. The method of claim 17, wherein the logical pages are received by a memory controller from a host.

19. The method of claim 17, further comprising generating a flash translation layer (FTL) table including the first table, the second table, and the third table.

20. The method of claim 17, further comprising:

receiving a read address;

accessing the first table using the read address to retrieve a cluster index identifying one of the clusters and a subsub-cluster offset;

accessing the second table using the retrieved cluster index to retrieve a sub-cluster index identifying one of the sub-clusters;

accessing the third table using the retrieved cluster index and the retrieved sub-cluster index to retrieve a subsub-cluster index; and retrieving a physical page of the memory device using the cluster index, the sub-cluster index, the subsub-cluster index and the sub-cluster offset.

\* \* \* \* \*